June 19, 1923.

O. E. BROWN 1,459,670

ADJUSTABLE CHAIN HOOK

Filed Aug. 29, 1922

WITNESSES

INVENTOR
O. E. BROWN
BY
ATTORNEYS

Patented June 19, 1923.

1,459,670

UNITED STATES PATENT OFFICE.

OSCAR EDWARD BROWN, OF BUFFALO, NEW YORK.

ADJUSTABLE CHAIN HOOK.

Application filed August 29, 1922. Serial No. 585,107.

*To all whom it may concern:*

Be it known that I, OSCAR E. BROWN, a citizen of the United States of America, and resident of Buffalo, county of Erie, State of New York, have invented a new and Improved Adjustable Chain Hook, of which the following is a full, clear, and exact description.

The present invention aims to provide an improved type of adjustable coupler or hook, for employment in any suitable relation, but for use preferably on the circumferential chain members of an anti-skid chain.

A particular object of the invention is the provision of such an improved hook, of simple and rugged construction and easily readjustable to take up slack in the chain, and yet provided with a locking means or hook-closure which when once set in locking position on the hook proper is secured against accidental disengagement as the result of unexpected strains, no matter how abrupt, or as the result of mud, sand or other objects being forced in, around or through any part of the entire hook device.

These and other objects will be better understood from the following description, when taken in connection with the accompanying drawing, showing a type of construction at present preferred but constituting merely an exemplifying embodiment of the invention.

In such drawing, in which like reference characters refer to like parts in the several views.

Figure 1:
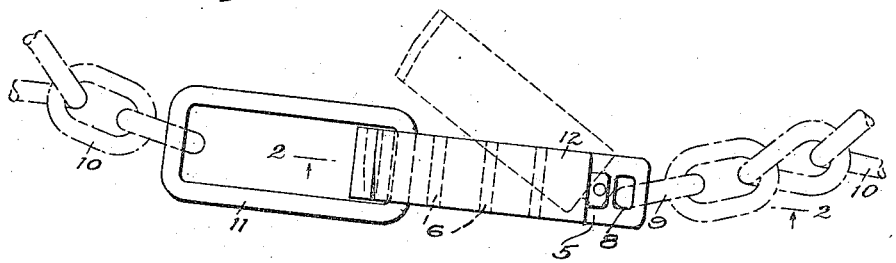
Figure 1 is a top plan view, the closure member of the hook device being shown in broken lines in unlocked position, and the chain-ends being shown in dot-and-dash.

The new hook includes an elongated hook member 5, having on its upper face a plurality of transverse partitions 6 to establish four (or any suitable number of) recesses 7, each recess a different distance from a terminal loop 8 for the permanent attachment of the end 9 of the circumferential tire-chain 10; whereby the special link 11 constituting the other end of said chain may be selectively set in the outer recess 7, as shown, or in any of the inner recesses 7 to take up slack as required.

Atop the hook member 5 is a closure member 12, the two members being pivoted together at 13— which pivot may be the rivet indicated, or a suitable machine screw.

Closure member 12, at its swinging end, carries a dependent, transverse projection 14, to be disposed completely in a special recess 15 in hook member 5 when the closure member is set to close all the recesses 7; this special recess 15 being also arranged transverse to the hook member 5 but beyond the four recesses 7.

Figure 4:
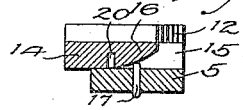
Figure 4 is a section on line 4—4 of Figure 2.

The end of projection 14 which first enters the recess 15 in setting the closure member over the hook member, is bevelled as shown in Figure 4, and this end of the projection constitutes a nose 16 to displace a pin or detent 17 from within the recess 15, as the projection 14 advances well into the recess. Such pin 16 is an integral part of a straight spring 18, the other end of which is riveted to the hook-member at 19; so that, as soon as the projection 14 is fully received in recess 14, the detent snaps into locking engagement with a cut-away part or hole 20 in the bottom of projection 14 behind nose 16.

Hook-member 5 is provided with a groove 21 for snugly receiving spring 18, from which it will be seen that with the closure and hook-members once locked together by projection 14 and detent 17, accidental unlocking is impossible. However, to permit instantaneous unlocking and separation of the two members when desired, the groove 21 has an intersecting notch or groove of greater depth, as indicated at 22, and into which a suitable tool, such as an ordinary nail, may be introduced manually to lift the spring 18 partially out of groove 21 and so render detent 17 temporarily inoperative.

Figure 2:
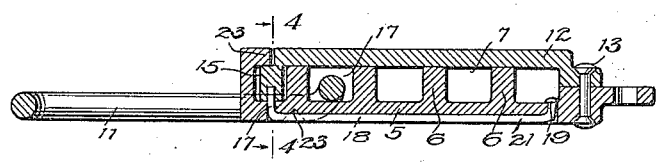
Figure 2 is a section on line 2—2 of Figure 1, but on an enlarged scale.
Figure 3:
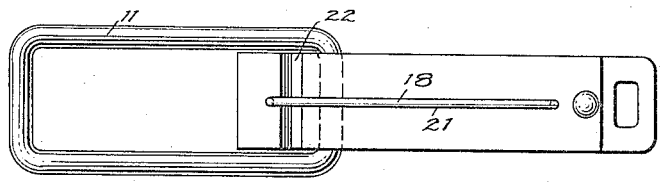
Figure 3 is a bottom plan view also on an enlarged scale.

Finally calling attention to the shouldered mounting of projection 14 on closure member 12, as clearly shown in Figure 2, and the interfitting ledge 23 formed on hook member 5 to partially overlie the special recess 15, it will be seen that I have provided, particularly, a construction which in its locked condition has all working parts so closely positioned and otherwise related as to obviate any reasonable chance of an accidental unfastening of the hook device, or such an accumulation of sand, mud, or the like as to prevent easy unfastening of said member instantly when desired; and a construction, also, whereby all the objects hereinabove set forth are attained.

Obviously the new hook structure is capable of a variety of uses, whether or not on a circumferential tire-chain; but when the hook is used to mount a chain on a tire, whether of the pneumatic or solid type, preferably the hook is so disposed that the spring 18 is in against the tire, as indicated in Figure 1.

It will be apparent, further, that various modifications can be made in the construction and arangement of parts as described, without departing from the spirit of the invention; the scope of protection contemplated being indicated by the appended claims:

I claim:

1. In an adjustable chain hook, in combination, a pair of co-acting relatively movable members constituting respectively the hook proper and a closure therefor, and spring-latch means for such members including a recess in one of the members, a projection on the other member receivable in the recess, a spring on such recessed member, and a detent carried by the spring for automatically engaging the projection when positioned in the recess thereupon positively to lock the projection against leaving the recess until the spring is thereafter manually readjusted.

2. In an adjustable chain hook, in combination, a pair of co-acting relatively movable members constituting respectively the hook proper and a closure therefor, and spring-latch means for such members including a recess in one of the members, a projection on the other member receivable in the recess, a spring on such recessed member, and a detent carried by the spring for automatically engaging the projection when positioned in the recess thereupon positively to lock the projection against leaving the recess until the spring is thereafter manually readjusted, the spring having a substantially straight length, and the spring-carrying member having a pair of intersecting grooves of different depths, within the shallower of which such spring-length is seated when the projection is locked in the recess.

3. In an adjustable chain hook, in combination, a pair of co-acting relatively movable members constituting respectively the hook proper and a closure therefor, and spring-latch means for such members including a recess in one of the members, a projection on the other member receivable in the recess, said projection having a bevelled nose, and a resiliently mounted detent in said recess to be engaged, displaced and passed by said nose in entering the recess, the projection being shaped in rear of the nose to permit the detent to return to its normal placement in the recess, when the projection is fully received in the recess, thereby to prevent withdrawal of the projection without subsequent displacement of the detent.

4. In an adjustable chain hook, in combination, a pair of co-acting relatively movable members constituting respectively the hook proper and a closure therefor, and spring-latch means for such members including a recess in one of the members, a projection on the other member receivable in the recess, the projection having a bevelled nose and a cut-away portion in rear of such nose, and a unitary resilient device secured on the recessed member and including a terminal portion constituting a detent first to be displaced by said nose and thereafter to interlock with said cut-away portion of the projection as the latter enters the recess.

5. In an adjustable chain hook, in combination, a pair of co-acting relatively movable members constituting respectively the hook proper and a closure therefor, and spring-latch means for such members including a recess in one of the members, a projection on the other member receivable in the recess, said projection having a bevelled nose, and a resiliently mounted detent in said recess to be engaged, displaced and passed by said nose in entering the recess, the projection being shaped in rear of the nose to permit the detent to return to its normal placement in the recess, when the projection is fully received in the recess, thereby to prevent withdrawal of the projection without subsequent displacement of the detent, the recessed member having an elongated surface groove, the detent being formed as a terminal offset from a straight length of resilient material completely seated in said groove when the detent is in locking position, and the recessed member having a second surface groove leading to the first groove intermediate the ends of said straight length of resilient material.

OSCAR EDWARD BROWN.